Dec. 23, 1969 J. HRDINA 3,485,295
DEVICE FOR THE TREATMENT OF A FLOW OF LIQUID SECTIONALIZED
BY FLUIDAL BUBBLES
Filed March 21, 1966

INVENTOR.
JIŘI HRDINA
BY
Attorney

United States Patent Office 3,485,295
Patented Dec. 23, 1969

3,485,295
DEVICE FOR THE TREATMENT OF A FLOW OF LIQUID SECTIONALIZED BY FLUIDAL BUBBLES
Jiří Hrdina, Prague, Czechoslovakia, assignor to Ceskoslovenska akademie ved, Prague, Czechoslovakia, a corporation of Czechoslovakia
Filed Mar. 21, 1966, Ser. No. 536,001
Claims priority, application Czechoslovakia, Mar. 26, 1965, 2,022/65
Int. Cl. F28f 13/08
U.S. Cl. 165—147                           1 Claim

ABSTRACT OF THE DISCLOSURE

In a device for the treatment of a flow of liquid sectionalized by fluidal bubbles the tubing carrying said flow passes a region of elevated temperature and is widened after its entrance thereinto and again narrowed at least at its exit therefrom, the said widening and/or narrowing being continuous or stepwise.

---

Figure 1:
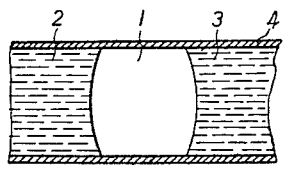

In many cases in both laboratory and industrial techniques it is important that a flow of a certain medium passing through a tubing be divided into individual sections separated from each other by means of a section of some other medium immiscible with and inert towards the first one. The effort in these cases is firstly to essentially prevent mixing of the individual sections of the thus divided first medium and, secondly, to suppress to a considerable extent the adhering to the walls. This is not realized with a one hundred percent effect and so the second medium, which in the form of bubbles or drops moves simultaneously with the first one divided thus into individual sections, causes according to the circumstances to a greater or smaller extent, but not fully, the suppression of the mixing of the liquids in view of the residual adhering of the first medium to the walls of the tubing.

If the second medium is a gas, it involves a number of advantages, especially an easy separability of the two media. However, using gas as the second medium involves an undesirable elasticity of the whole hydraulic-pneumatic system. This elasticity becomes exceedingly large especially in those cases when a longer tubing is used and particularly when at least a part of the tubing is exposed to elevated temperatures, which on the other hand usually is an inevitable condition, though, because the principal objective or the whole device frequently is to have the medium exposed for a certain period of time to elevated temperatures, as a rule for the purpose of increasing the reaction rate of the process that takes place in the medium.

Frequently the objective is to have a mixture of certain liquids kept during its passage through a reactor for a certain period of time at an elevated temperature, for example 100° C. A typical example of this case are analysers of amino acids which employ in their evaluation system a ninhydrine colorimetric reaction. The reaction takes a certain time, usually 15 min. in order that it may proceed sufficiently far and the resulting states may be sufficiently stable. These conditions lead in standard types of amino acid analysers, working with continuous media not divided into separated sections, to the use of a capillary reactor realized by a Teflon capillary of a bore of 0.7 mm. and a length of 30 m., as corresponds to the required reaction time of 15 min. at a standard flow rate of 30 ml./hr. Such a capillary tubing involves the disadvantage of a considerable blurring of the chromatographic zones whose separation was accomplished by a chromatographic process in a partition column; this applies even to slow traditional processes. The known application of division of a flow of eluate from a column into sections, for example by means of nitrogen bubbles formed by admitting a flow of nitrogen into the flow of the eluate, may mean a considerable reduction of the total partition accomplished by the column as compared with the case without bubbles; but the advantage of this method is not by far fully utilized if the bubbles and the sections of the flow of eluate divided by them are not absolutely equal, the same as the doses of the ninhydrine reagent which must be in the individual sections mixed with the eluate in an absolutely equal ratio if sufficient accuracy and perfectness of partition in the resulting chromatogram is to be accomplished.

If very significant advantages are to be accomplished which under favourable circumstances may provide a division of the flow into sections separated from each other, it is necessary to take regard to the fact that bubbles increase in size in the reactor at an elevated temperature for two reasons. One of them is the expansion of the gas at the elevated temperature. It would cause for a temperature increase from 25° C. to 100° C. an increase in volume by approx. 25%. A substantially greater increase in volume of bubbles occurs, however, in consequence of the second cause which consists therein at an elevated temperature of for example 100° C. the proportion of vapours that passed from the liquid to the gaseous medium increases substantially in the bubbles. If water alone were used, the vapour tension at 100° C. would be about 1 atm. (deviations are caused among others by the curved surfaces of the meniscs in the capillary tubing) and hence, in consequence of the respective proportion of the partial pressure in the total atmosphere of the bubbles, the bubbles would increase in size to very large volumes if no arrangements were made against such an undesirable consequence. Such arrangements may consist in using additive substances changing the surface tension, but especially in using increased pressures in the tubings through which is led the flow of the two media divided into sections. It is known that by not too great an increase in pressure, for example by 0.1 to 0.2 atm. (which can easily be accomplished hydrostatically by increasing the pressure of the overflow, by 1 to 2 m. above the reactor), it is possible to substantially reduce this unwelcome effect of the partial pressure of the vapours of the first medium. But the bubbles will at any rate increase in size considerably at an elevated temperature and thus will influence unfavourably the optimum ratio between their diameter and length and also the ratio between the lengths of the sections of the second and the first medium. Considered as optimum must be such a ratio which leads to a minimum blurring of the zones accomplished by a chromatographic partition, with the least possible elasticity of the whole column preserved in the entire tubing filled with alternating sections of the two media.

From this point of view it would be most convenient to accomplish so short bubbles in the whole tubing, which may possibly be of varying thickness, as corresponds to the different temperatures to which the various portions of the tubing are exposed, that the bubbles may prevent to the greatest possible extent mixing of the liquids contained in individual sections. In an ideal case when no particle of the first medium would adhere to the walls of the capillary tubing in the places of the bubbles, the bubbles would be so short as to be bounded only by the two meniscs that form the boundary between the two media, the distance of the places where both the meniscs end under an angle other than zero on the walls of the capillary being almost zero. However, in actual cases when a liquid moves, it is impossible in general to realize a complete separation of the liquid of the first medium from the walls of the capillary. In general, a certain amount of the liquid divided into small droplets will as a rule adhere to the walls, especially at greater rates, and at a more rapid motion the meniscs will continuously pass to a film, through a very thin one, which will more or less continuously coat the inner walls of the capillary and pass to the back menisc.

If the bubbles are exceedingly long, the effect of the adhering film on the passage of the liquid from one section to another via the separating bubble will be smaller because the film becomes somewhat thinner as the distance of the menisc from which it originated increases; but, on the other hand, this involves an increase of the path of the liquid required in order that the time of its passage through the reactor may correspond to the original time requirement. This necessary length of the tubing in the reactor increases by a length by which all the bubbles together increased in length.

At a small diameter of the tubing the velocity of the liquid in such tubing will be very great, which not only affects unfavourably the undesirable adhering of the liquid to the walls of vessels and/or the thickness of the film adhering to the walls in the places of bubbles, but also prolongues in the ratio of the increase of the velocity the length of the tubing through which the flow must pass in order that the required reaction time may be reached. For these principal reasons tubings of a greater diameter will be much more convenient. They will not only help shorten the required length of the path of the liquid in a required time of heating at a previously given value of flow rate, but also the rate of the motion of the liquids and the bubbles in relation to the walls of the tubing will substantially be decreased, the consequence of which will be a reduction of the thickness of the film adhering to the walls of the capillary, both because of the smaller velocity and indirectly because the thickness of the film will be smaller also due to a smaller curvature of the inner surface of the tubing and hence also of the film.

The questions of the thickness of the film that adheres in an undesirable way to the walls of the capillary tubing through which move individual sections of a medium mutually separated from each other by certain amounts of gas, the gas bubbles having only an imperfect piston effect, can roughly be summarized as follows:

If the sections of the medium do not move in relation to the tubing in which they alternate with sections of a gas, the boundaries between the gas and the liquid will be formed in the form of the known meniscs that meet with the wall of the tubing under a certain angle. At a steady state and a stable equilibrium, both the meniscs are symmetrical and the extreme angles of the two meniscs are equal. A different situation is when a system moves in relation to a tubing. At small velocities the above symmetrical state changes to an asymmetrical one, the front meniscs of the bubbles in the direction of the moving sections of the liquid separated from each other (by bubbles) will be deeper and more curved, whereas the opposite back meniscs of the bubbles by which another liquid section begins will be shallower and less curved. But up to a certain velocity the extreme angle of the back menisc toward the wall of the tubing will still be greater than zero and the liquid will not form on the inner walls of the tubing any continuous layer or film. At most in some places where the adherence between the liquid and the wall of the tubing is increased, sporadic droplets will adhere to the walls of the tubing. However, with increasing velocity a more or less continuous, later fully continuous film will begin to form, into which the front menisc of the bubble will pass without ending under an angle other than zero on the wall of the capillary. The thickness of the film close beyond the menisc will be greater than in more distant places, but at sufficiently great velocities the thickness of the film at a certain distance beyond the back menisc will already be of a more or less constant value. This thickness will be in the whole range the greater, the velocity of the motion of the system moving inside the tubing will be.

It is evident that only at very small velocities it may be expected that bubble pistons will almost perfectly separate the individual sections of the liquid phase. As the velocity will increase, the percentage will increase which after a certain path in the tubing will pass from a preceding section of the liquid in the form of droplets or a continuous film to a following section. This may cause a very significant undesirable violation of the basic principle of separation of individual sections of a liquid by means of inserted sections of a gas.

It is evident that if the undesirable effect of the transference of liquids between individual sections or equalization of concentration gradients between individual sections is to be cut down to a minimum and a maximum of the piston effect proper of the gas bubbles is to be secured, it will be necessary to select in the device such dimensions that the rate of the motion be as small as possible, as long as other effects described below do not limit this possibility. A reduction of the rate of the motion will be accomplished above all by choosing as large diameters of the tubing as possible, without the bubbles too much approaching spherical shape when their piston function would already become insecure.

In many practical extremely important cases when the objective is, as given above, to have liquid phases in their individual sections exposed for a certain period of time to the effect of elevated temperature, the increase in the diameter of the tubing will lead to a very favourable effect as to the thickness of the film and as to the small relative velocity in relation to the tubing, the reason being also that both the length of the tubing through which the medium divided into sections must pass and the relative rate of the motion will be changed with the square of the increase of the diameter of the tubing, whereby even the thickness of the film will substantially change. It is evident that the percentage contamination as an undesirable but not entirely removable phenomenon involved in the flow of a liquid in the above way will significantly decrease as the diameter of the tubing will increase. This desired increasing of the tubing is of course limited with regard to the minimum required length of the bubbles, with respect to the diameter of the tubing, at which the bubbles can retain not only their piston function as such but also such a relative length in relation to their diameter that both meniscs of the same bubble may still be at a sufficient distance from each other, with regard to the decreasing thickness of the film with the distance from the menisc which creates the film behind itself when moving. More precisely, the unfavourable effect of the exceedingly small distance between the two meniscs or the effect of the thickness of the film, which is close behind the menisc greater than at greater distances from the menisc, must not exceed the improving effects of the increasing diameter of the tubing.

In practically very important cases when a system of sections of a gas and a liquid is to be exposed in certain portions of the total path to an elevated temperature, several partial consequences may be combined in a very favourable manner to a suitable final effect. If gas pistons pass from places in the tubing of a low temperature to places in the tubing where the temperature is high, the volume of the gas bubbles increases, as mentioned above, not only in consequence of the thermal expansion of the gas itself, but above all because a far greater amount of vapours passes to the gaseous phase from the neighbouring liquid sections. At high temperatures this effect may mean even a multiple of the increase of the volume of the liquid. Thus for example at an eightfold increase it will be possible to make the diameter of the tubing approximately twice as great, with the shape of the bubbles being approximately the same.

In principle it is possible to say that the ratio of the length of the bubbles in relation to the length if individual liquid sections, or the absolute length of the bubbles, on passage through the reactor will roughly be optimum when the bubbles under all conditions remain as small as possible in a tubing of as large an inner diameter as possible, as long as there is no more serious danger of both the bubbles tearing off from the walls and the thickness of the film increasing too much in consequence of too great a proximity of both the meniscs bounding the bubble with regard to the passing of the central menisc to the film covering the wall.

In principle it is necessary that the bubbles in those portions of the tubing which are not exposed to elevated temperatures should correspond in an optimum manner to the motion relations, especially in that the bubbles should not divide into smaller ones, whereas in those portions where the tubing is exposed to higher temperatures, they must have a substantially greater diameter, as corresponds to the viewpoints previously mentioned. Both portions must pass into each other continuously if possible, and with such a degree of enlargement or narrowing which corresponds to the physical relations determining both the size of the bubble and the effect of the adhering to the walls according to the above points of view.

The principle of the method according to the invention consists therein that the diameter of the gas bubbles and of the liquid sections and the length of the liquid sections change with temperature variations in the tubing, in other words that the diameter of the gas bubbles and of the liquid sections increases, and the length of the liquid sections and the rate of the motion of the gas bubbles and the liquid sections increases before or on passage to a region of a lower temperature.

The device according to the invention consists in principle therein that the bore of the tubing, through which passes a flow of consecutive alternating sections of liquid and gas, changes continuously or stepwise in accordance with temperature variation, that is to say that the bore of the tubing through which passes a flow of consecutive alternating sections of liquid and gas increases continuously or stepwise in accordance with temperature increase, or that the bore of the tubing through which passes the flow of consecutive alternating sections of liquid and gas decreases continuously or stepwise before or at the exit of the tubing from a region of higher temperatures.

The device according to the invention is usually in practice realized in the form of a reactor where the reaction space in the form of a tube is submerged into a bath for maintaining elevated temperature and the bore of the tube varies in such a manner that on entering an environment of an elevated temperature the bore increases in the direction of the flow, and before or at the exit from this environment it decreases again.

Figure 2:
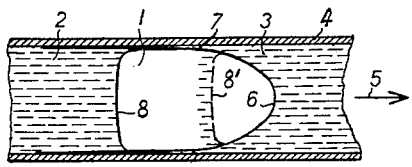

The principle of the invention follows from the appended drawing. FIGS. 1 and 2 are schematic representations of the shape of the menisci which form a boundary between the bubble 1 and the sections 2 and 3 of a liquid in a capillary tubing 4. FIG. 1 shows the situation when a static equilibrium is reached without any flow in the tubing 4. FIG. 2 on the other hand shows the deformation of the bubble 1 and the meniscs 6 and 8 bounding it at a greater flow rate in the direction of the arrow 5. The front menisc 6 will be strongly concave and will continuously pass into the film 7 which will coat the inner wall of the capillary 4. According to the size of the bubble, the back menisc will pass to shape and position 8 or 8′ when its circumferential portions will pass continuously into the film 7 which coats the inner wall of the capillary 4. The thickness of this film 7, in which the back menisc 8 touches it in the case of a greater bubble, will be smaller than the thickness of the film 7 in which the menisc 8′ touches it in the case of a smaller bubble.

Figure 3:
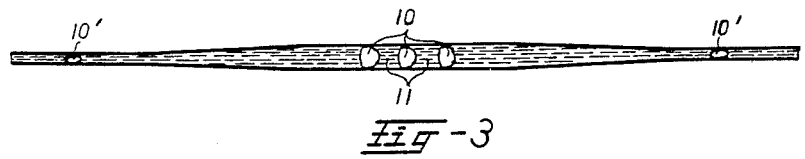

FIG. 3 shows schematically the relations which will be established in a capillary 9 which in its middle portion is exposed to a higher temperature than in the adjoining portions. In the middle portion, bubbles 10 of a larger volume alternate with sections 11 of a liquid medium. In the adjoining portions, where the temperature is lower, the bubbles 10′ have a smaller volume.

Figure 4:
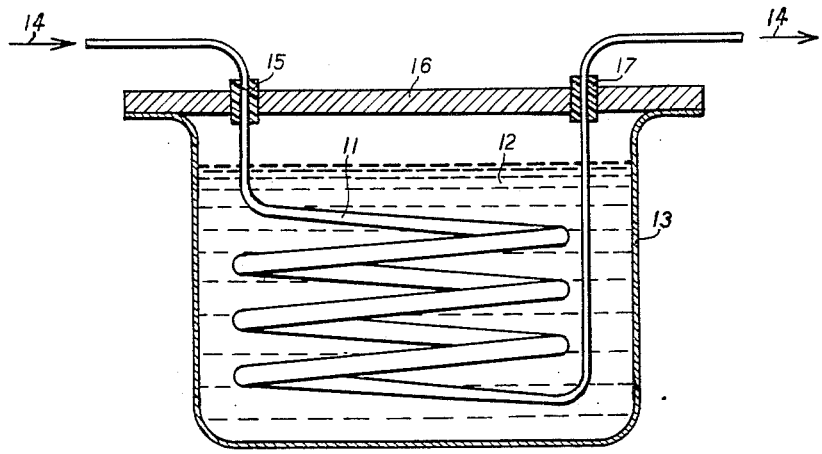

FIG. 4 shows an example of a reactor for carrying out reactions at an elevated temperature, whose reaction space is constituted by a capillary 11 submerged into a bath 12 in a vessel 13, the capillary passing into narrower diameters in the places where it enters or leaves the bath 12 maintaining an elevated temperature. In the entry portion the capillary, in which flows a medium in the direction of the arrow 14, enters through a packaging 15 of a closing cover 16, and it exits in a similar manner through another packing 17 out of the reactor again. Shown here is the case when the narrowing of the capillary 11 is realized rather far before the exit of the capillary from the reactor. In principle, this narrowing may be carried out as far as in those places where the bubbles decrease their volume in consequence of a fall of temperature.

The function of the reactor is as follows:

Alternating sections of liquid and gas move in the direction of the arrow 14 through the capillary 11, the bubbles increasing their volume after entering the space of the reactor and especially after entering below the level of the bath 12. Their optimum shapes are accomplished by the diameter of the reaction capillary 11 being continually increased in the portion where the increasing of the bubbles' volume takes place. The capillary 11 retains this increased diameter as far as the portion where its diameter decreases again in order that the bubbles, which change their volume on leaving the bath 12, may have an adequate size in relation to the diameter of the capillary 11.

What I claim is:

1. In a device for the treatment of a flow of liquid sectionalized by fluidal bubbles the improvement comprising in combination heating means; a substantially capillary tubing carrying said flow through said heating means; said tubing gradually widening as it enters into said heating means and again gradually narrowing as it leaves the same, and a widened tubular section of substantially constant diameter between its widening and narrowing sections.

References Cited

UNITED STATES PATENTS

| 34,648 | 3/1862 | Sherman | 165—147 |
|---|---|---|---|
| 2,899,280 | 8/1959 | Whitehead. | |
| 3,098,717 | 7/1963 | Ferrari. | |
| 3,116,754 | 1/1964 | Ferrari. | |

ALAN COHAN, Primary Examiner

U.S. Cl. X.R.

137—1, 154